United States Patent
Landrum et al.

(10) Patent No.: US 9,790,927 B1
(45) Date of Patent: Oct. 17, 2017

(54) WIND TURBINE BLADE DOUBLE PIVOT TRANSPORTATION SYSTEM AND METHOD

(71) Applicants: Scott C. Landrum, Southlake, TX (US); T. Christopher King, Keller, TX (US)

(72) Inventors: Scott C. Landrum, Southlake, TX (US); T. Christopher King, Keller, TX (US)

(73) Assignee: BNSF Logistics, LLC, Springdale, AR (US)

(*) Notice: Subject to any disclaimer, the term of this patent is extended or adjusted under 35 U.S.C. 154(b) by 0 days.

(21) Appl. No.: 15/228,522

(22) Filed: Aug. 4, 2016

(51) Int. Cl.
  *B60P 7/08* (2006.01)
  *F03D 13/40* (2016.01)
  *B60P 3/40* (2006.01)

(52) U.S. Cl.
  CPC .......... *F03D 13/40* (2016.05); *B60P 3/40* (2013.01)

(58) Field of Classification Search
  CPC .................. B60P 3/40; F03D 13/40
  USPC .......... 410/32, 34, 44, 45, 53, 120; 280/404; 105/355
  See application file for complete search history.

(56) References Cited

U.S. PATENT DOCUMENTS

| | | | |
|---|---|---|---|
| 6,983,844 B2 | 1/2006 | O'Kane et al. | |
| 7,303,365 B2 | 12/2007 | Wobben | |
| 7,670,090 B1 | 3/2010 | Landrum et al. | |
| 7,704,024 B2 | 4/2010 | Kootstra et al. | |
| 7,713,007 B2 | 5/2010 | Kootstra | |
| 8,056,203 B2 | 11/2011 | Madsen | |
| 8,096,739 B1 | 1/2012 | Landrum et al. | |
| 8,192,117 B1 | 6/2012 | Landrum et al. | |
| 8,240,962 B2 | 8/2012 | Livingston et al. | |
| 8,342,491 B2 | 1/2013 | Jorgensen et al. | |
| 8,382,407 B1 | 2/2013 | Landrum et al. | |
| 8,602,700 B2 | 12/2013 | Johnson | |
| 8,632,286 B2 | 1/2014 | Wessel et al. | |
| 8,641,339 B2 | 2/2014 | Schibsbye et al. | |
| 9,315,200 B1 | 4/2016 | Landrum et al. | |
| 2010/0143062 A1* | 6/2010 | Tobergte | B60P 3/40 410/44 |
| 2014/0050547 A1 | 2/2014 | Hiremath et al. | |
| 2016/0017861 A1 | 1/2016 | Sigurdsson | |

* cited by examiner

*Primary Examiner* — Stephen Gordon
(74) *Attorney, Agent, or Firm* — Dan Brown Law Office; Daniel R. Brown

(57) ABSTRACT

A wind turbine blade rail fixture set employing a pair of support assemblies, each having a bolster, radius arm, and pivot disposed on a pair of railcars to minimize lateral overhang as the train traverses railroad curves, and having a slidable carriage disposed on one radius arm to accommodate changes in length between the bolsters.

27 Claims, 8 Drawing Sheets

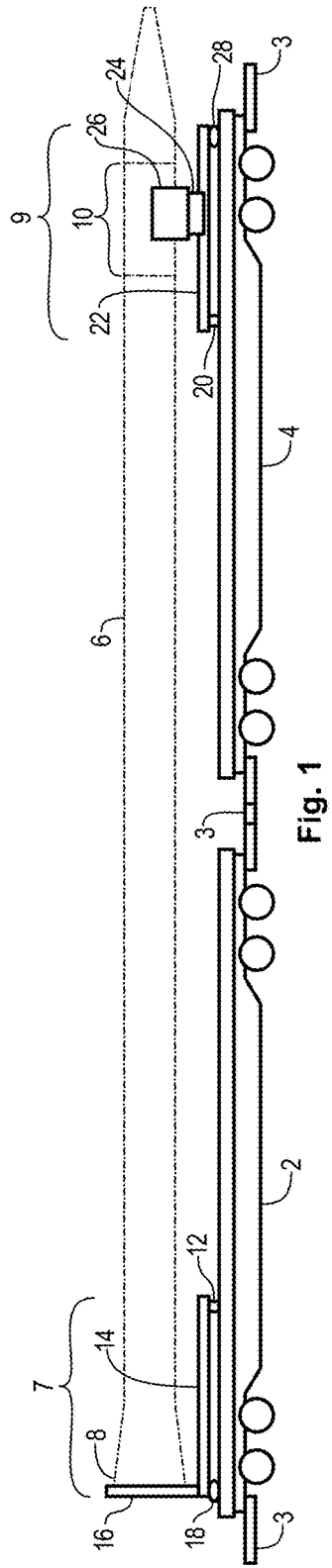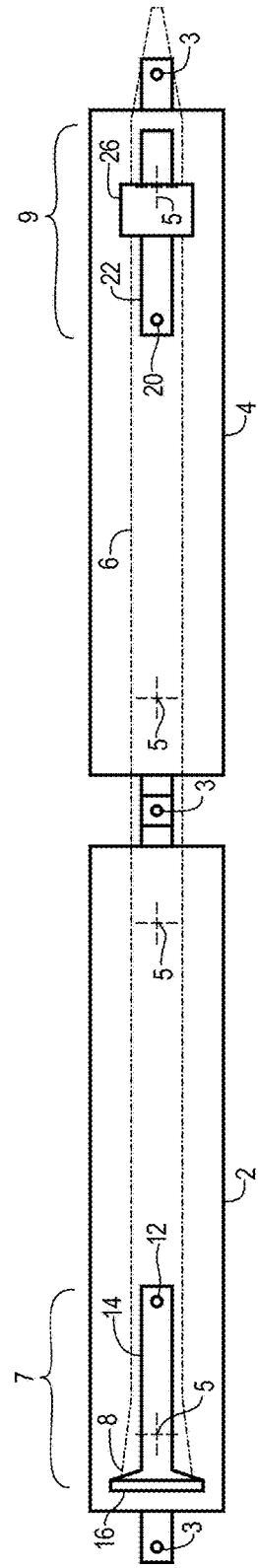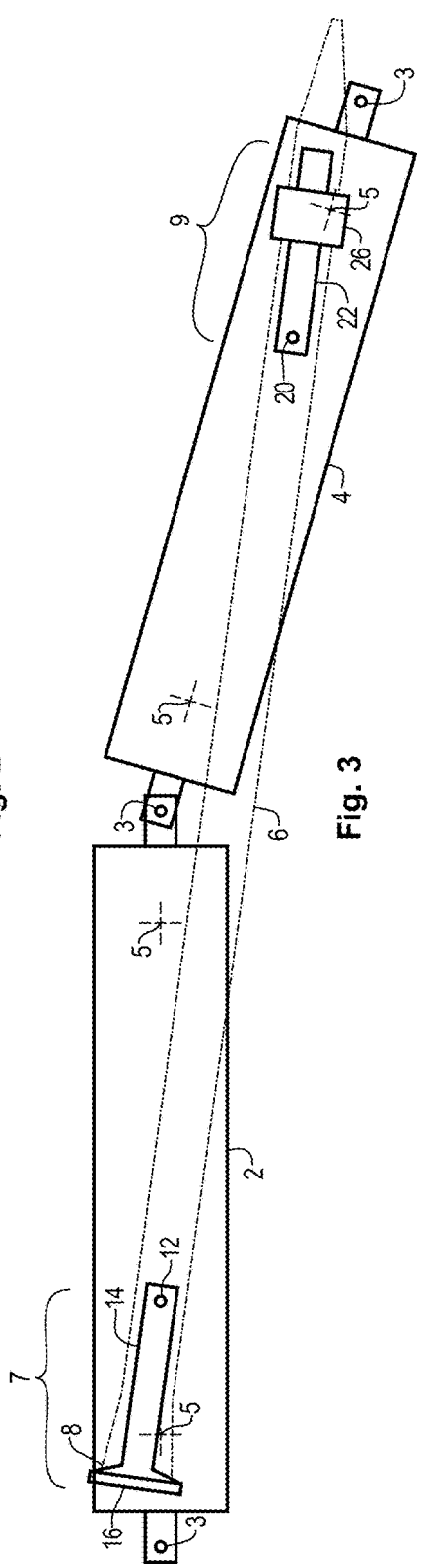

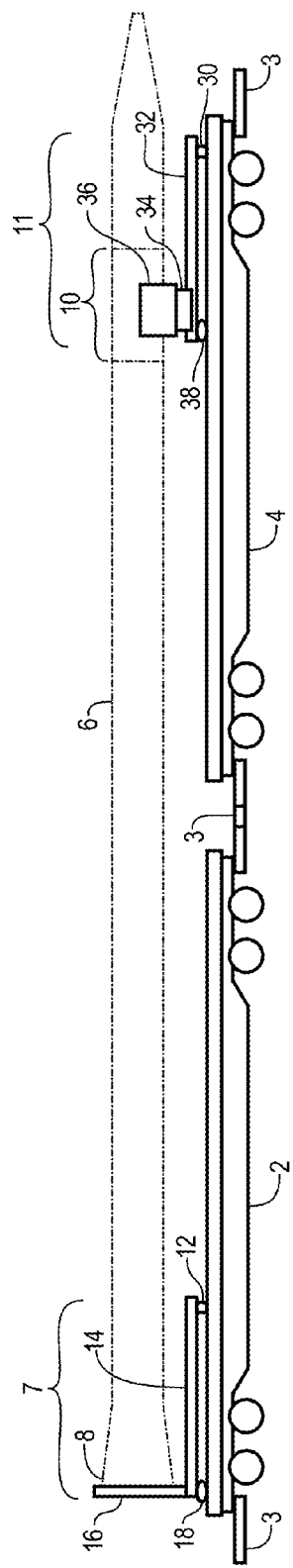
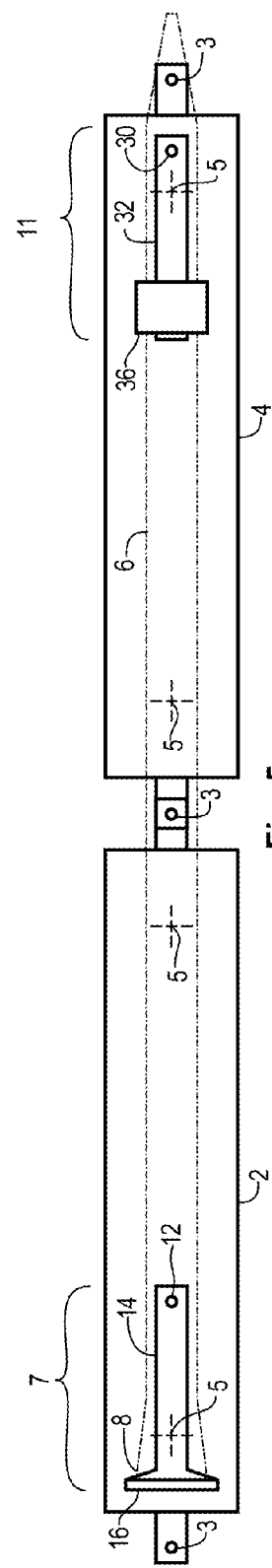
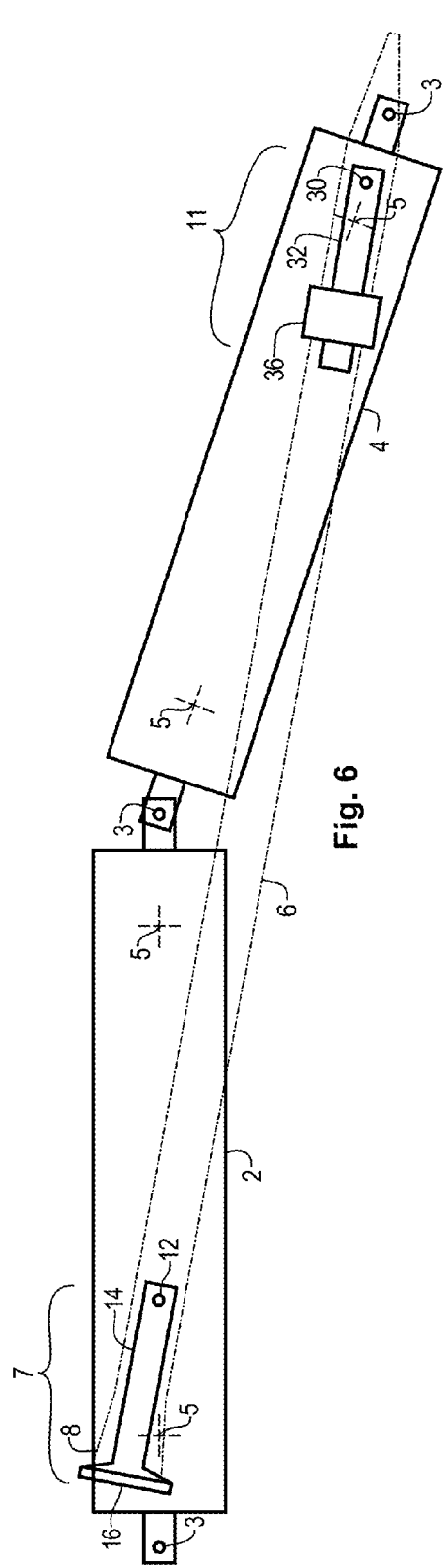
Fig. 4
Fig. 5
Fig. 6

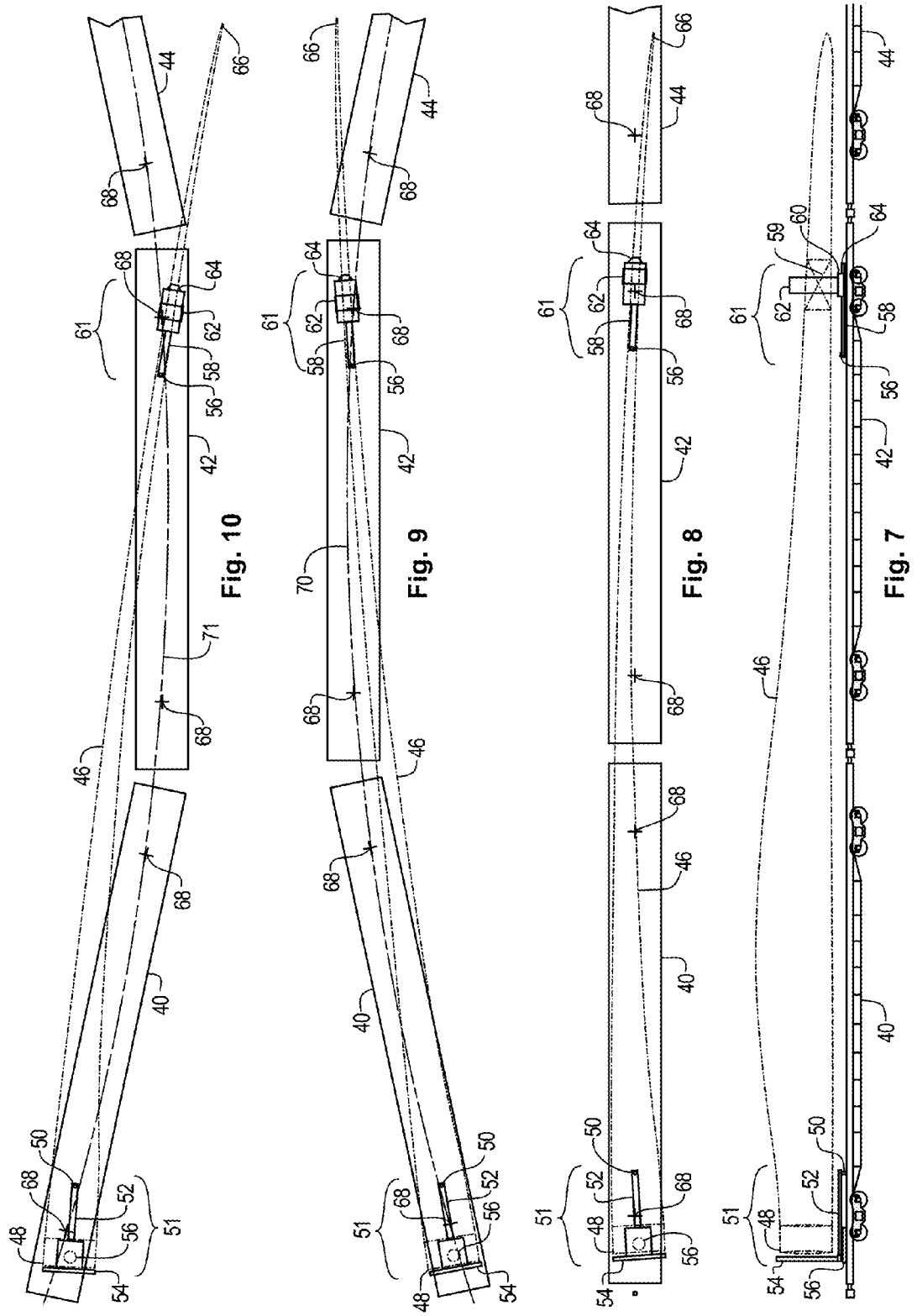

Section A-A

Section B-B

WIND TURBINE BLADE DOUBLE PIVOT TRANSPORTATION SYSTEM AND METHOD

BACKGROUND OF THE INVENTION

Field of the Invention

The present invention relates to transporting wind turbine blades. More specifically, the present invention relates to systems and methods for transporting elongated objects, including wind turbine blades, whose lengths dictate the use of plural railcars coupled together, and the use of specialized fixtures to control load balancing and load overhang railway clearance issues.

Description of the Related Art

Large-scale wind turbines, which are used to generate electric power, employ lengthy and elongated components, including towers and wind turbine blades. At the time of this writing, wind turbine blades in excess of two hundred feet long are being manufactured, transported, and placed into service. Among other modes of transportation, wind turbine blades are transported by railroad, most commonly on rail flatcars. Since the length of a common rail flatcar is about ninety-two feet, coupler to coupler, a single wind turbine blade can substantially exceed the length of two railcars. This creates a range of railway clearance issues that limit the choice of acceptable railway routes, particularly with regard to overhang of the wind turbine blade around curves. In addition to overhang clearance issues, there are issues that arise with respect to maintaining the center of gravity on the wind turbine blade within the narrow acceptable range allowed for the railcars.

The choice of support locations for carrying a wind turbine blade is significantly constrained. Wind turbine blades are mounted only at a root end when fixed to a wind turbine assembly, and their strength profile is designed accordingly. However, for rail transport, a wind turbine blade must also be supported along the length of the blade, usually out toward the tip end of the blade, where the strength profile is generally too low to handle the concentrated loads at a point of support. Wind turbine blade manufacturers address this issue by designing a support region along the length of the blade, generally at about two-thirds to three-fourths of the total length from the root end. Thus, any railroad support fixture set is limited to supporting the blade only from the root end and the manufacturer's predetermined support region. It is a complex engineering problem to balance these issues related to railway clearance, balance, and support locations when designing railroad support fixtures for transporting wind turbine blades, as well as other elongated objects. Thus, it can be appreciated that there is a need in the art for improved railroad support fixtures for elongated objects transported using two, or more, railcars.

SUMMARY OF THE INVENTION

The need in the art is addressed by the systems and methods of the present invention. The present disclosure teaches a system for transporting an elongated member having a root end and a support region located along its length, using a first railcar coupled to a second railcar. The system includes a first support assembly fixed to the root end by a root bolster that is fixed to a first radius arm, which extends below the elongated member to a first pivot that is coupled to the first railcar. The first pivot enables the root end to laterally traverse the first railcar along an actuate path centered at the first pivot. The system further includes a second support assembly that has a second bolster, which engages the support region, and is coupled to a second radius arm that extends below the elongated member to a second pivot coupled to the second railcar. The second pivot enables the support region to laterally traverse the second railcar along an actuate path centered at the second pivot. In addition, there is a slidable carriage disposed between the second radius arm and the second bolster, which slides parallel with the second radius arm. The first radius arm and the second radius arm are maintained in alignment as the first railcar and the second railcar traverse railroad curves, and this causes the root bolster and the second bolster to laterally traverse the first railcar and the second railcar, respectively, while the slidable carriage accommodates changes in distance between the root bolster and the second bolster.

In a specific embodiment of the foregoing system, the elongated member is a wind turbine blade, and the support region is predetermined by the wind turbine blade design specifications. In another specific embodiment, the second radius arm extends in a direction that is toward the first railcar, or that is away from the first railcar. In a refinement to this embodiment, the direction is selected based on the location of the support region with respect to lengths of the first and second railcars. In another refinement to this embodiment, the direction is selected to yield a minimum lateral overhang of the elongated member for a given radius of railroad curvature. In another refinement to this embodiment, the direction is selected to maintain the center of gravity of the elongated member within the center of gravity requirement of the first and second railcars In a specific embodiment of the foregoing system, the first radius arm length and the second radius arm length are selected to yield a minimum lateral overhang of the elongated member for a given radius of railroad curvature. In another specific embodiment, the first radius arm length and the second radius arm length are selected to maintain the center of gravity of the elongated member within the center of gravity requirement of the first and second railcars. In another specific embodiment, the first radius arm and the second radius arm are maintained in generally parallel arrangement by the stiffness of the elongated member.

In a specific embodiment of the foregoing system, the root bolster is removably engaged with the first radius arm, and the second bolster is removably engaged with the second radius arm. In a refinement to this embodiment, the root bolster and the second bolster are fixed to and provided with the elongated member. In yet another refinement, the second bolster conformally engages the elongated member along the support region.

In a specific embodiment, the foregoing system further includes a first transverse bearing disposed between the first radius arm and the first railcar. In a refinement to this embodiment, the first traverse bearing comprises a wheel. In another refinement, the wheel engages a bearing plate disposed on the first railcar. In yet another refinement, the first transverse bearing comprises a pair of orthogonally aligned sub-carriages.

In a specific embodiment of the foregoing system, a second transverse bearing is disposed between the second radius arm and the second railcar. In a refinement to this embodiment, the second transverse bearing comprises a wheel.

In a specific embodiment, the foregoing system further includes a first vertical retention means fixed to the first railcar, which is configured to prevent the first radius arm from moving vertically. In another specific embodiment, the system further includes a second vertical retention means fixed to the second railcar and configured to prevent the second radius arm from moving vertically.

In a specific embodiment of the foregoing system, the slidable carriage engages the second radius arm and the second bolster with at least a first wheel. IN another specific embodiment, the slidable carriage engages the second radius arm and the second bolster with a low friction polymeric material.

The present disclosure teaches a method for transporting an elongated member with a root end and a support region located along its length, using a first railcar coupled to a second railcar. The method includes the steps of attaching a first radius arm to the first railcar using a first pivot, and fixing a root bolster between the root end and the pivot arm, and thereby extend the pivot arm below the elongated member, and enabling the root end to laterally traverse the first railcar along an actuate path centered at the first pivot. The method also includes attaching a second radius arm to the second railcar using a second pivot, and engaging a second bolster between the support region and a slidable carriage, which slides along the second radius arm, where the second radius arm extends below the elongated member, thereby enabling the support region to laterally traverse the second railcar along an actuate path centered at the second pivot. The method also includes the step of maintaining alignment of the first radius arm and the second radius arm as the first railcar and the second railcar traverse railroad curves, and thereby causing the root bolster and the second bolster to laterally traverse the first railcar and the second railcar, respectively, and also, accommodating changes in distance between the root bolster and the second bolster by movement of the slidable carriage.

In a specific embodiment, the foregoing method further includes extending the second radius arm in a direction that is toward the first railcar or that is away from the first railcar. In a refinement to this embodiment, the method further includes selecting the direction according to the location of the support region with respect to lengths of the first and second railcars. In another refinement to this embodiment, the method further includes selecting the direction to yield a minimum lateral overhang of the elongated member for a given radius of railroad curvature. In another specific embodiment, the method further includes selecting a length of the first radius arm and a length of the second radius arm to yield a minimum lateral overhang of the elongated member for a given radius of railroad curvature.

In a specific embodiment, the foregoing method further includes maintaining the first radius arm and the second radius arm in generally parallel alignment using the stiffness of the elongated member. In another specific embodiment, the method further includes disposing a first transverse bearing between the first radius arm and the first railcar. In another specific embodiment, the method further includes disposing a second transverse bearing between the second radius arm and the second railcar.

In a specific embodiment, the foregoing method further includes fixing a first vertical retention member to the first railcar, thereby preventing the first radius arm from moving vertically, and, fixing a second vertical retention member to the second railcar, thereby preventing the second radius arm from moving vertically.

BRIEF DESCRIPTION OF THE DRAWINGS

FIG. 1 is a side view drawing of an elongated load carried by two railcars according to an illustrative embodiment of the present invention.

FIG. 2 is a top view drawing of an elongated load carried by two railcars according to an illustrative embodiment of the present invention.

FIG. 3 is a top view drawing of an elongated load carried by two railcars according to an illustrative embodiment of the present invention.

FIG. 4 is a side view drawing of an elongated load carried by two railcars according to an illustrative embodiment of the present invention.

FIG. 5 is a top view drawing of an elongated load carried by two railcars according to an illustrative embodiment of the present invention.

FIG. 6 is a top view drawing of an elongated load carried by two railcars according to an illustrative embodiment of the present invention.

FIG. 7 is a side view drawing of a wind turbine blade carried by two railcars according to an illustrative embodiment of the present invention.

FIG. 8 is a top view drawing of a wind turbine blade carried by two railcars according to an illustrative embodiment of the present invention.

FIG. 9 is a top view drawing of a wind turbine blade carried by two railcars according to an illustrative embodiment of the present invention.

FIG. 10 is a top view drawing of a wind turbine blade carried by two railcars according to an illustrative embodiment of the present invention.

DESCRIPTION OF THE INVENTION

Figure 12:
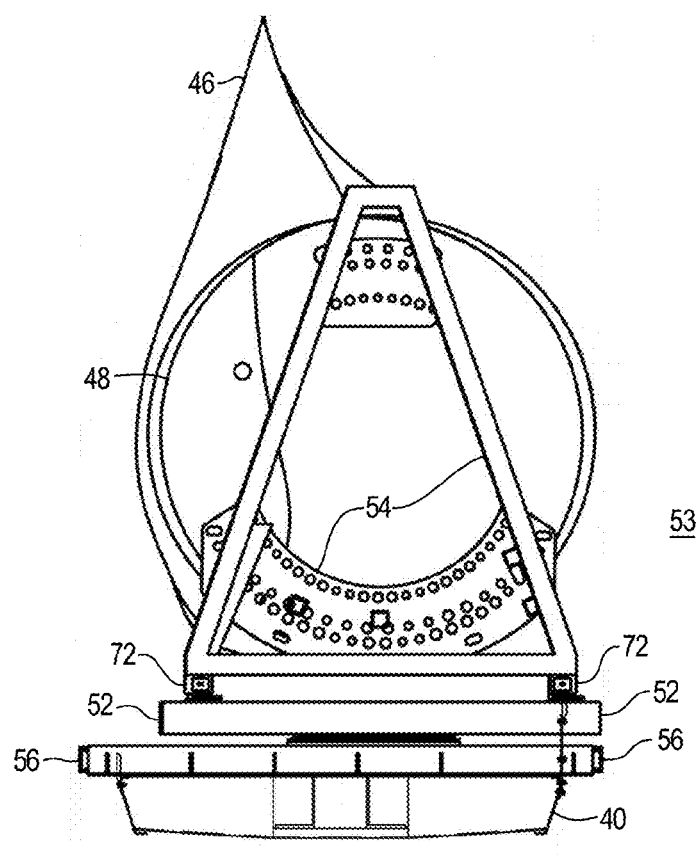
FIG. 12 is an end view drawing of a root end support assembly according to an illustrative embodiment of the present invention.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope hereof and additional fields in which the present invention would be of significant utility.

In considering the detailed embodiments of the present invention, it will be observed that the present invention resides primarily in combinations of steps to accomplish various methods or components to form various apparatus and systems. Accordingly, the apparatus and system components and method steps have been represented where appropriate by conventional symbols in the drawings, showing only those specific details that are pertinent to understanding the present invention so as not to obscure the disclosure with details that will be readily apparent to those of ordinary skill in the art having the benefit of the disclosures contained herein.

In this disclosure, relational terms such as first and second, top and bottom, upper and lower, and the like may be used solely to distinguish one entity or action from another entity or action without necessarily requiring or implying any actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a" does not, without more constraints, preclude the existence of additional identical elements in the process, method, article, or apparatus that comprises the element.

The teachings herein address the challenges associated with transporting large wind turbine blades, as well as other large airfoils and elongated structures, via railroad. Such airfoils and devices share the characteristic of a rigid root end that is designed with sufficient strength to support the entire airfoil and accommodate the flexing and stresses involved during operation thereof. Such airfoils are typically tapered along their length to a tip end. The section modulus of the airfoil gradually decreases from the root end to the tip end. Generally, the strength profile of the airfoil decreases from the root end to the tip end. In considering the need to support such an airfoil during transportation, it will be appreciated that the airfoil will typically lie in a substantially horizontal orientation, and will require two or more support locations. The longitudinal axis of the airfoil will also be generally aligned with the longitudinal axis of the train. During the transportation of an airfoil, the stresses and bending loads are quite different that those encountered during normal operation. The root end of the airfoil will almost certainly have sufficient strength as a support location during transportation, and the tip end will most likely not have sufficient strength as a support location. Along a predetermined support region between the root end and the tip end, there will exist sufficient strength to support the airfoil during transportation. The specific location of the support region will vary from airfoil to airfoil, and is at the design control of the airfoil manufacturer. In some designs, it may be a narrowly specified portion of the airfoil length that the manufacturer has reinforced to bear concentrated transportation loads. In other designs, the midsection may be a broader region between the root end and the tip end.

During railroad transport, an airfoil is supported on railcars using fixtures designed to locate and support the airfoil, as well as accommodate the dynamic factors associated with railroad travel. It will be appreciated by those skilled in the art that transport of goods by rail is constrained by railroad clearance limits, weight limits, balance and center of gravity, as well as wind and dynamic loading factors. Clearance and balance issues are particularly acute where railroad open top loading rules must be satisfied. Where standard clearances are exceeded, which is commonly true for wind turbine blades, clearance calculations must be conducted, and submitted to the railroad for route approval. The selected route must accommodate the load's deviation beyond standard railroad clearance limits. Thus, it is significantly beneficial to employ fixtures that constrain deviation from standard clearance limits as much as possible. In doing so, the available routes for a given loading will be greater. The present invention advances the art by employing reactive loading fixtures that shift the position of the load to maintain balance and limit deviations from the standard clearance profiles as the train traversed curves in the railway.

Reference is directed to FIG. 1, which is a side view drawing of an elongated load 6 carried by two railcars 2, 4 according to an illustrative embodiment of the present invention. This embodiment represents a generic set-up for transporting an elongated member 6 using a first support assembly 7 and a second support assembly 9. Each of the support assemblies 7, 9 are pivotally connected to the railcars 2, 4 respectively. The railcars 2, 4 are flatcars joined by rail couplers 3 located at each end of the railcars. The elongated member 6 has a root end 8, which is fixed to a root bolster 16. The root bolster 16 is fixed to a first radius arm 14, which is, in turn, coupled to the railcar 2 with a first pivot 12. The axis of rotation of the first pivot 12 is vertical. The weight of the elongated member 6 is supported by the root bolster 16 and radius arm 14. The weight is transferred to the first railcar 2 through a transverse bearing 18, which accommodates the arcuate movement of the root end 8 defined by the location of the first pivot 12 and the length of the first radius arm 14.

Along the length of the elongated member 6 in FIG. 1 is located a support region 10, which is identified as a region within which a concentrated support loading is allowed. A second bolster 26 engages the support region 10 to support the weight of the elongated member 6. The second bolster 26 slidably engages a second radius arm 22 through a slidable carriage 24. The second radius arm 22 is coupled to the second rail car through a second pivot 20. The slidable carriage 24 slides along the length of the second radius arm 22, which is generally along the longitudinal axis of the second railcar 4 while the railcars are travelling on straight rails. This angle deviates as the railcars traverse a curved section of rail. The weight is transferred to the second railcar 4 through a transverse bearing 28, which accommodates the arcuate movement of the support region 10 defined by the location of the second pivot 20 and the length of the second radius arm 22. Note that the arcuate movement of the support regions varies in radius somewhat as the slidable carriage 24 slide along the second radius arm 22.

Reference is directed to FIG. 2, which is a top view drawing of an elongated load 6 carried by two railcars 2, 4 according to an illustrative embodiment of the present invention. FIG. 2 corresponds to FIG. 1. In FIG. 2, note that centers of the railcar trucks are identified with crossed lines 5, typical. These are the load bearing points of the railcar trucks, and as such identify the preferred location of the center of gravity along the longitudinal axes of the railcars for the loads carried by the railcars 2, 4. It will be appreciated by those skilled in the rail loading arts that the net loading center of gravity must be located close to the railcar's centerline, with some cars limited to a sixteen inch wide maximum deviation range.

In FIG. 2, the first and second railcars 2, 4 are oriented as travelling a straight section of track, so their longitudinal centerlines fall on a straight line, and the truck centerlines 5 are also aligned. In this configuration, the first radius arm 14 and the second radius arm 22 are also aligned such that the elongated member 6 load is centered on the first and second railcars 2, 4. Thus, the load is balanced in that the load's center of gravity is directly over the railcar's centerline. Note that this is an ideal situation where the load is symmetrical and where the first and second pivots 12, 20 are fixed on the centerline of the first and second railcars 2, 4. The present invention also contemplates arrangements where the pivots are located elsewhere on the railcars, which is useful where the elongated member itself is not symmetrical, such as in the case of wind turbine blades. Note that in FIG. 2, the second support assembly 9 employs a radius arm 22 and second pivot 20 that are oriented in the direction toward the first railcar 2 as referenced with the location of the second bolster 26.

Reference is directed to FIG. 3, which is a top view drawing of an elongated load 6 carried by two railcars according to an illustrative embodiment of the present invention. FIG. 3 corresponds with FIGS. 1 and 2. In FIG. 3, the first railcar 2 and second railcar 4 are positioned as traversing a curved section of rail (not shown), and are therefore not aligned along their longitudinal axes. The stiffness of the elongated member 6 and its fixed connections to the root bolster 16 and second bolster 26 causes the first radius arm 14 and second radius arm 22 to rotate about their respective first and second pivots 12, 20. This results in a triangular relationship between the first railcar 2, the second railcar 4, and the elongated member 6, and a shortening of the straight-line distance between the first pivot 12 and second pivot 20, as compared to the straight track depiction in FIG. 2. Since the root bolster 16 and second bolster 26 are fixed to the elongated member 6, the triangular shortening must be accommodated by slidable carriage 24 (see FIG. 1) as the second bolster 26 is slid along the second radius arm 22 to accommodated the triangular shortening, as depicted in FIG. 3 compared to FIG. 2.

Also note, in FIG. 3, that the central region of the elongated member 6 overhangs toward the inside of the curve and the root end 8, as well as the support regions shift toward the outside of the curve. The degree of shift toward the outside of the curve is a function of the length of radius arm 14, 22, and is a design choice for both balancing the load and controlling the degree of overhang of the elongated member 6. This produces a balancing action where the net center of gravity of the elongated member 6 is maintained within the load location tolerances of the railcars 2, 4. The calculation of the precise center of gravity is a function of the mass distribution within the elongated member 6, as well as the geometry of the radius arms 14, 22, and pivots 12, 20.

Reference is directed to FIG. 4, which is a side view drawing of an elongated load 6 carried by two railcars 2, 4 according to an illustrative embodiment of the present invention. This embodiment represents another generic set-up for transporting an elongated member 6 using a first support assembly 7 and a second support assembly 11. FIG. 4 corresponds with FIG. 1, except for use of a different second support assembly 11. Each of the support assemblies 7, 11 are pivotally connected to the railcars 2, 4 respectively.

The railcars 2, 4 are flatcars joined by rail couplers 3 located at each end of the railcars. The elongated member 6 has a root end 8, which is fixed to a root bolster 16. The root bolster 16 is fixed to a first radius arm 14, which is, in turn, coupled to the railcar 2 with a first pivot 12. The axis of rotation of the first pivot 12 is vertical. The weight of the elongated member 6 is supported by the root bolster 16 and radius arm 14. The weight is transferred to the first railcar 2 through a transverse bearing 18, which accommodates the arcuate movement of the root end 8 defined by the location of the first pivot 12 and the length of the first radius arm 14.

Along the length of the elongated member 6 in FIG. 4 is located a support region 10, which is identified as a region within which a concentrated support loading is allowed. A second bolster 36 engages the support region 10 to support the weight of the elongated member 6. The second bolster 36 slidably engages a second radius arm 32 through a slidable carriage 34. The second radius arm 32 is coupled to the second rail car 4 through a second pivot 30. The slidable carriage 34 slides along the length of the second radius arm 32, which is generally along the longitudinal axis of the second railcar 4 while the railcars are travelling on straight rails. This angle deviates as the railcars traverse a curved section of rail. The weight is transferred to the second railcar 4 through a transverse bearing 38, which accommodates the arcuate movement of the support region 10 defined by the location of the second pivot 30 and the length of the second radius arm 32. Note that the arcuate movement of the support regions varies in radius somewhat as the slidable carriage 34 slide along the second radius arm 32.

Reference is directed to FIG. 5, which is a top view drawing of an elongated load 6 carried by two railcars 2, 4 according to an illustrative embodiment of the present invention. FIG. 5 corresponds to FIG. 4. In FIG. 5, the first and second railcars 2, 4 are oriented as travelling a straight section of track, so their longitudinal centerlines fall on a straight line with the truck centerlines 5, which are also aligned. In this configuration, the first radius arm 14 and the second radius arm 32 are also aligned such that the elongated member 6 load is centered on the first and second railcars 2, 4. Thus, the load is balanced in that the load's center of gravity is directly over the railcar's centerline. Note that this is another ideal situation where the load is symmetrical and where the first and second pivots 12, 30 are fixed on the centerline of the first and second railcars 2, 4. The present invention also contemplates arrangements where the pivots are located elsewhere on the railcars, which is useful where the elongated member itself is not symmetrical.

Note that in FIG. 5, the second support assembly 11 employs a radius arm 32 and second pivot 30 that are oriented in the direction away from the first railcar 2 as referenced with the location of the second bolster 36. The decision to orient the radius arm 32 away from the first railcar 2 is a design choice based on several factors. The location of the support region 10 dictates where the second bolster 36 must be located. This, taken in combination with the length and number of railcars can force the hand of the designer. In addition, the geometry of the load overhang and center of gravity requirements may determine whether orienting the second radius arm toward of way from the first railcar 2 is preferred.

Reference is directed to FIG. 6, which is a top view drawing of an elongated load 6 carried by two railcars according to an illustrative embodiment of the present invention. FIG. 6 corresponds with FIGS. 4 and 5. In FIG. 5, the first railcar 2 and second railcar 4 are positioned as traversing a curved section of rail (not shown), and are therefore not aligned along their longitudinal axes. The stiffness of the elongated member 6 and its fixed connections to the root bolster 16 and second bolster 36 causes the first radius arm 14 and second radius arm 32 to rotate about their respective first and second pivots 12, 30. This results in a triangular relationship between the first railcar 2, the second railcar 4, and the elongated member 6, and a shortening of the straight-line distance between the first pivot 12 and second pivot 30, as compared to the straight track depiction in FIG. 5. Since the root bolster 16 and second bolster 36 are fixed to the elongated member 6, the triangular shortening must be accommodated by slidable carriage 34 (see FIG. 4) as the second bolster 36 is slid along the second radius arm 32 to accommodated the triangular shortening, as depicted in FIG. 6 compared to FIG. 5.

Also note, in FIG. 6, that the central region of the elongated member 6 overhangs toward the inside of the curve and the root end 8 shifts toward the outside of the curve. However, with the radius arm 32 oriented away from the first railcar 2, the support regions 10 (see FIG. 4) is shifted to the inside of the curve as well. This may appear counterintuitive to the concept of balancing the load, but in cases where the tip end of the elongated member extends over a third railcar (discussed hereinafter), this arrangement can be a useful design option. The degree of shift toward the outside, or inside, of the curve is a function of the length of radius arms 14, 32, and is a design choice for both balancing the load and controlling the degree of overhang of the elongated member 6. The calculation of the precise center of gravity is a function of the mass distribution within the elongated member 6, as well as the geometry of the radius arms 14, 32, and pivots 12, 30.

Reference is directed to FIG. 7, which is a side view drawing of a wind turbine blade 46 carried by two railcars 40, 42 according to an illustrative embodiment of the present invention. Note that in this illustrative embodiment, the length of the blade 46 dictates the use of an idler car 44 to provide clearance from the blade tip 66. This embodiment depicts a blade 46 in excess of two hundred feet in length, having a predetermined support region 59, and rail flatcars that are approximately ninety-two feet in length. These dimension imply that the tip 66 of the blade 46 will overhang to such an extent that particular care must be given to clearances. The root end 48 of the blade 46 is carried by a first support assembly 51. The support region 59 of the blade 46 is carried by a second support assembly 61. The first support assembly 51 comprises a root bolster 54 that is fixed to the root end 48 of the blade 46. The root bolster 54 is fixed to a first radius arm 52, which is coupled to the first railcar 40 by first pivot 50. The axis of rotation of the first pivot 50 is vertical. The weight of the blade 46 is supported by the root bolster 54 and radius arm 52. The weight is transferred to the first railcar 40 through a first transverse bearing 56, which accommodates the arcuate movement of the root end 48 defined by the location of the first pivot 50 and the length of the first radius arm 52.

The second support assembly 61 in FIG. 7 comprises a second bolster 62 that engages the support region 59 to support the weight of the blade 46. The second bolster 62 slidably engages a second radius arm 58 through a slidable carriage 60. The second radius arm 58 is coupled to the second rail car through a second pivot 56. The slidable carriage 60 slides along the length of the second radius arm 58, which is generally along the longitudinal axis of the second railcar 42 while the railcars are travelling on straight rails. This angle deviates as the railcars traverse a curved section of rail. The weight is transferred to the second railcar 42 through a second transverse bearing 64, which accommodates the arcuate movement of the support region 59 defined by the location of the second pivot 56 and the length of the second radius arm 58. Note that the arcuate movement of the support regions varies in radius somewhat as the slidable carriage 60 slide along the second radius arm 58. In this embodiment, the second radius arm 58 and second pivot 56 are oriented in the direction of the first rail car 40. In another embodiment, that orientation could be away from the first railcar 40. The idler railcar 44 does not carry any weight of the blade 46, but rather ensures clearance for the tip 66 end of the blade 46.

Reference is directed to FIG. 8, which is a top view drawing of a wind turbine blade 46 carried by two railcars 40, 42, and an idler car 44, according to an illustrative embodiment of the present invention. FIG. 8 corresponds to FIG. 7. In FIG. 8, note that centers of the railcar trucks are identified with crossed lines 68, typical. These are the load bearing points of the railcar trucks, and as such identify the preferred location of the center of gravity along the longitudinal axes of the railcars for the loads carried by the railcars 40, 42. In this illustrative embodiment, the first and second railcars 40, 42 are oriented as travelling a straight section of track, so their longitudinal centerlines fall on a straight line and the truck centerlines 68 are also aligned. In this embodiment, the wind turbine blade 46 has a curved profile, as is common with modern wind turbine blades, so that it cannot lie along the longitudinal axes of the railcars 40, 42. Designers, having knowledge of the mass distribution in the blade 46, position the blade on the railcars 40, 42 such that it balances on the longitudinal centerline of the railcars 40, 42. This positioning dictates the location of the first support assembly 51 and the second support assembly 61. It is common for neither of the support assemblies to lie on the centerline of the railcars. Note that the first radius arm 52 and second radius arm 58 are generally, but not precisely, aligned with the longitudinal centerline of the railcars 40, 42.

Reference is directed to FIG. 9, which is a top view drawing of a wind turbine blade 46 carried by two railcars 40, 42 according to an illustrative embodiment of the present invention. FIG. 9 corresponds with FIGS. 7 and 8. In FIG. 9, the railcars, 40, 42, and 44 are depicted as traversing a right curved section of railway, illustrated by track centerline 70. Since the railcars 40, 42, and 44 are traversing a curved section of rail (not shown), they are not aligned along their longitudinal axes. The stiffness of the blade 46, and its fixed connections to the root bolster 54 and second bolster 62 causes the first radius arm 52 and second radius arm 58 to rotate about their respective first and second pivots 50, 56. This results in a triangular relationship between the first railcar 40, the second railcar 42, and the blade 46, and a shortening of the straight-line distance between the first pivot 50 and second pivot 56, as compared to the straight track depiction in FIG. 8. Since the root bolster 54 and second bolster 62 are fixed to the blade 46, the triangular shortening must be accommodated by slidable carriage 60 (see FIG. 7) as the second bolster 62 is slid along the second radius arm 58 to accommodated the triangular shortening, as depicted in FIG. 9 compared to FIG. 8.

Also note, in FIG. 9, that the central region of the blade 46 overhangs toward the inside of the curve and the root end 48, as well as the support region 59 shift toward the outside of the curve. And, the tip 66 of the blade 46 has the most pronounced overhang. The degree of shift toward the outside of the curve is a function of the length of radius arms 52, 58, and is a design choice for both balancing the load and controlling the degree of overhang of the blade 46. This produces a balancing action where the net center of gravity of the blade 46 is maintained within the load location tolerances of the railcars 40, 42. The calculation of the precise center of gravity is a function of the mass distribution within the blade 46, as well as the geometry of the radius arms 52, 58, and pivots 50, 56.

Reference is directed to FIG. 10, which is a top view drawing of a wind turbine blade 46 transported by two railcars 40, 42, and an idler car 44, according to an illustrative embodiment of the present invention. FIG. 10 corresponds with FIGS. 7 and 8. In FIG. 10, the railcars, 40, 42, and 44 are depicted as traversing a left curved section of railway, illustrated by track centerline 71. This figure illustrates a challenge associated with transporting curved wind turbine blades, such as blade 46. When the curvature of the track matches the curvature of the blade, there is a beneficial narrowing of the blade overhang. However, as in this FIG. 10, when the curvature of the blade 46 is reverse of the curvature of the track 71, the overhang issue becomes most challenging for designers. Note, in FIG. 10, that the central region of the blade 46 overhangs toward the inside of the curve further than in FIG. 9. Also note, in FIG. 10, that the root end 48 extends further to the outside of the curve than in FIG. 9. Note also that the deviation of the root end 48 is problematic from a balancing perspective because the bulk of the mass of the blade 46 is located at the root end 48. The tip 66 end of the blade 46 in FIG. 10 is also most extreme, and may dictate limits on the available railroad routes that could accommodate such a load.

Figure 11:
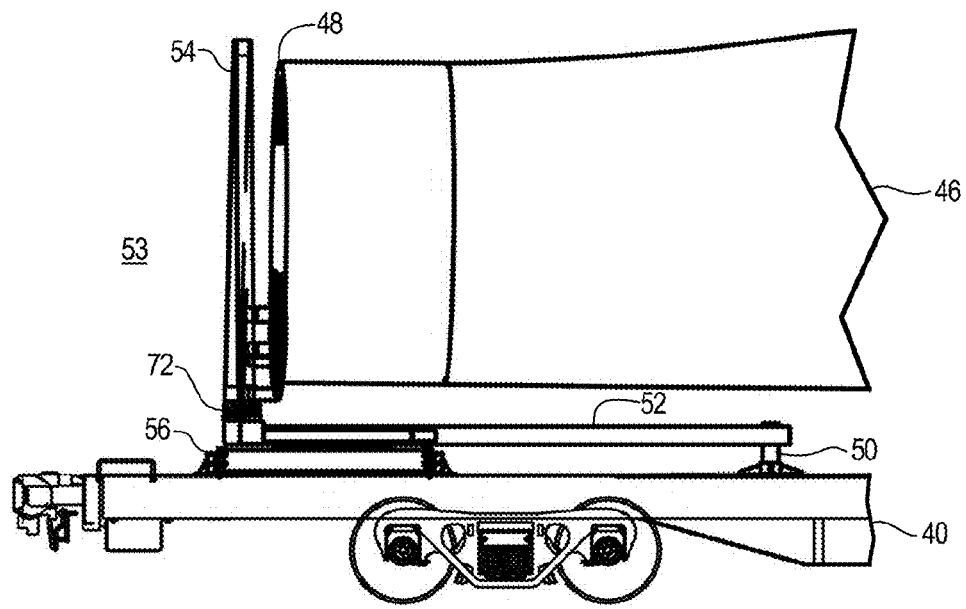
FIG. 11 is a side view drawing of a root end support assembly according to an illustrative embodiment of the present invention.

Reference is directed to FIG. 11 and FIG. 12, which are a side view drawing and an end view drawing, respectively, of a root end support assembly 53 according to an illustrative embodiment of the present invention. FIGS. 11 and 12 generally correspond with FIG. 7. FIGS. 11 and 12 provide further details of the wind turbine blade 46 root end 48 support assembly 53. The first pivot 50 is welded to the first railcar 50 and pivotally connects to the first radius arm 52 about a vertically oriented axis of rotation. These components are fabricated from mild steel plate, sections, bars, and pipes, as will be appreciated by those skilled in the art. The opposite end of the first radius arm 52 is connected to a root bolster 54, which is, in turn, bolted to the root end 48 of the blade 46. In some embodiments, the root end bolster 54 is provided with the blade 46 by the blade manufacturer, and is also used for support in other transportation modes and for storage. The connection between the first radius arm 52 and root bolster 54 may be selectively made using twist lock fasteners 72, as are known to those skilled in the art.

The weight of the root end 48 of the blade 46 is carried by the root bolster 54 and first radius arm 52, through a first transverse bearing assembly 56, which will be more fully discussed hereinafter. The root end 48 is enabled to laterally traverse the railcar 40 along the arcuate path defined by the first pivot 50 location and length of the first radius arm 52. The first transverse bearing 56 may comprise various structures and materials to enable the load bearing and movement features of the invention. For example, one or more wheels may be positioned and aligned to achieve these functions. Polymeric bearing surfaces may be positioned to provide low friction sliding surfaces. In the illustrative embodiment of FIGS. 11 and 12, a pair of orthogonally aligned sub-carriages are employed in a Cartesian arrangement that enables movement along the requisite arc.

Figure 13:
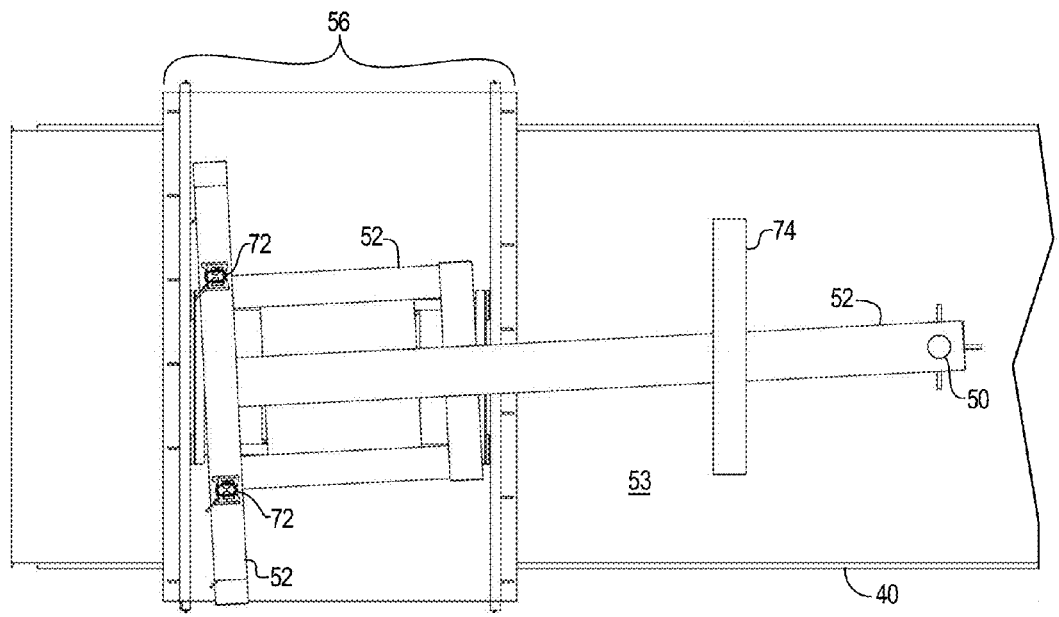
FIG. 13 is a top view drawing of a root end support assembly according to an illustrative embodiment of the present invention.
Figure 14:
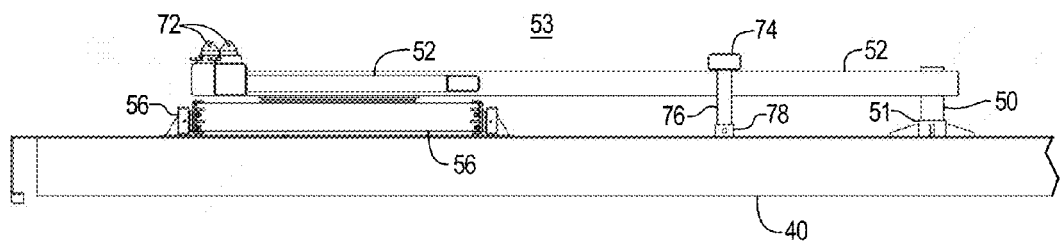
FIG. 14 is a side view drawing of a root end support assembly according to an illustrative embodiment of the present invention.
Figure 15:
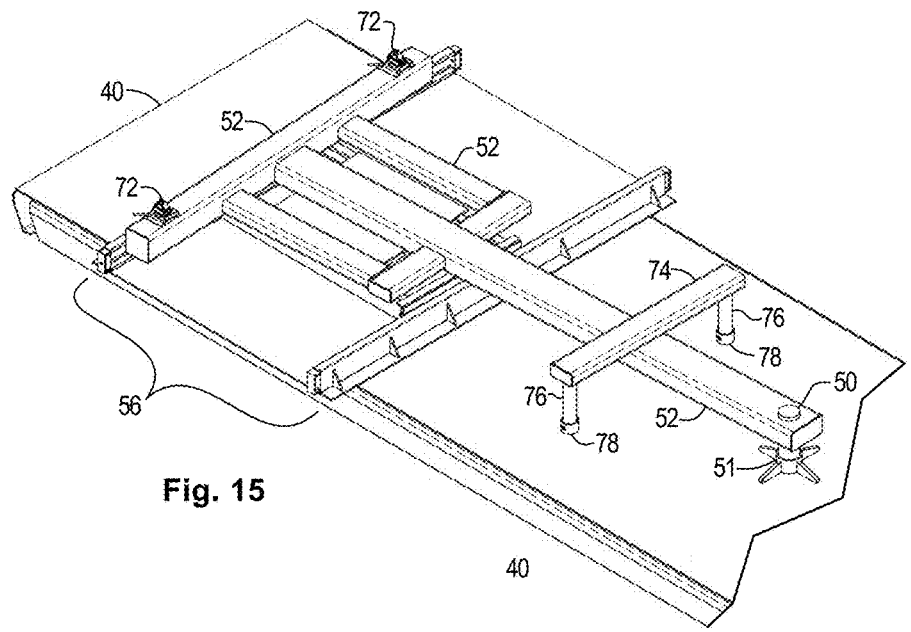
FIG. 15 is a perspective view drawing of a root end support assembly according to an illustrative embodiment of the present invention.

Reference is directed to FIG. 13, FIG. 14, and FIG. 15, which are a top view drawing, a side view drawing, and a perspective view drawing, respectively, of the root end support assembly 53 according to an illustrative embodiment of the present invention. These figures provide further details of the root end support assembly 53 by removing the blade and root bolster (neither shown) from the drawing views. A fixed portion 51 of the first pivot 50 is welded to the railcar 40. These components are comprised of a pair of pipe sections that engage in a vertical axis bearing arrangement. The first adius arm 52, which is a rectangular steel section, is vertically retained in place using a vertical retention member 74 held in position using a pair of vertical supports 76, which are removably pinned to deck fittings 78 welded to the first railcar 40. This arrangement prevents the first radius arm 52 from moving vertically during transportation of the blade (not shown). The twist lock fasteners 72 are connected to the first radius arm 52, and are for removably retaining the root bolster (not shown). The first transverse bearing assembly 56 is disposed between the first radius arm 52 and the first railcar 40 to carry the weight of the blade (not shown) against the first railcar 40. The configuration of the first radius arm 52 is adapted for engaging the root bolster (not shown), as may be required.

Figure 16:
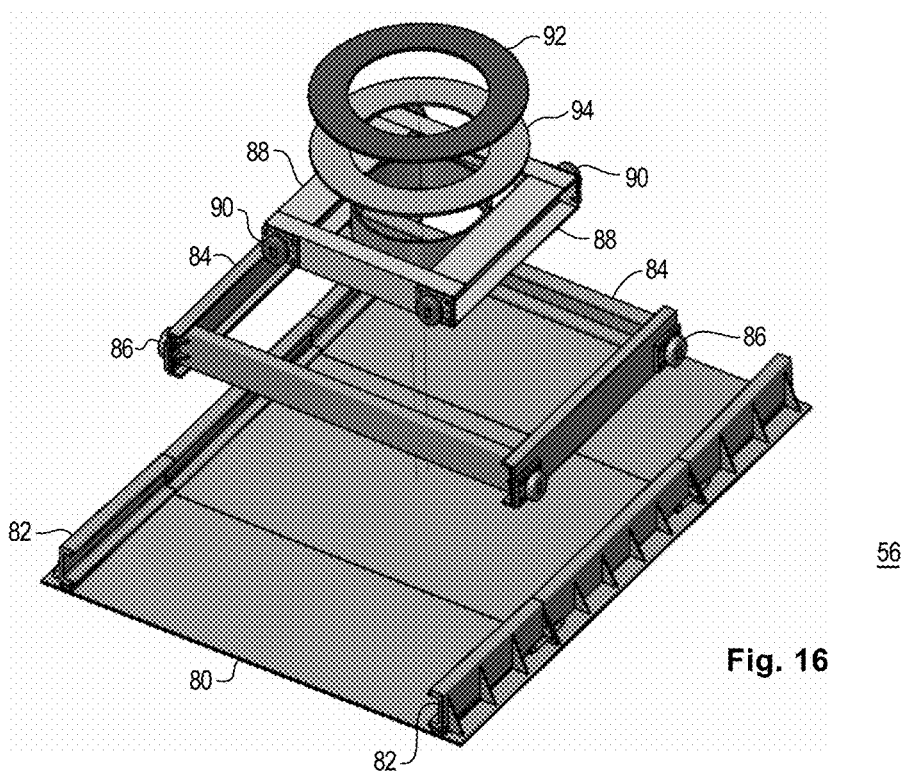
FIG. 16 is an exploded view drawing of a transverse bearing assembly according to an illustrative embodiment of the present invention.

Reference is directed to FIG. 16, which is an exploded view drawing of a first transverse bearing assembly 56 according to an illustrative embodiment of the present invention. As noted hereinbefore, there are a number of transverse bearing designs that might be employed by designers. The first transverse bearing 56 of this illustrative embodiment employs a pair of orthogonal sub-carriages 84, 88, which enable movement of the upper carriage 88 anywhere within the constraints of two pairs of rails 82, 84. A base plate 80 with a pair of rails 82 is welded to the first railcar (not shown). The lower sub-carriage 84 rides on wheels 86 that engage the rails 82. In the illustrative embodiment, the lower sub-carriage 84 travels transverse of the longitudinal axis of the first railcar (not shown). The upper sub-carriage 88 has wheels 90 that engage the lower sub-carriage frame 84, acting as rails for the wheels 90. This arrangement provides orthogonal axes of movement for the upper sub-carriage 88. The upper sub-carriage 88 has a support ring 94 that engages a polymeric bearing 92, which carriers the underside of the first radius arm (not shown). In this manner, the first radius arm (not shown) is enabled to move along the aforementioned arcuate path as the first transverse bearing assembly 56 transfers the load to the first railcar 40 (not shown).

Figure 17:
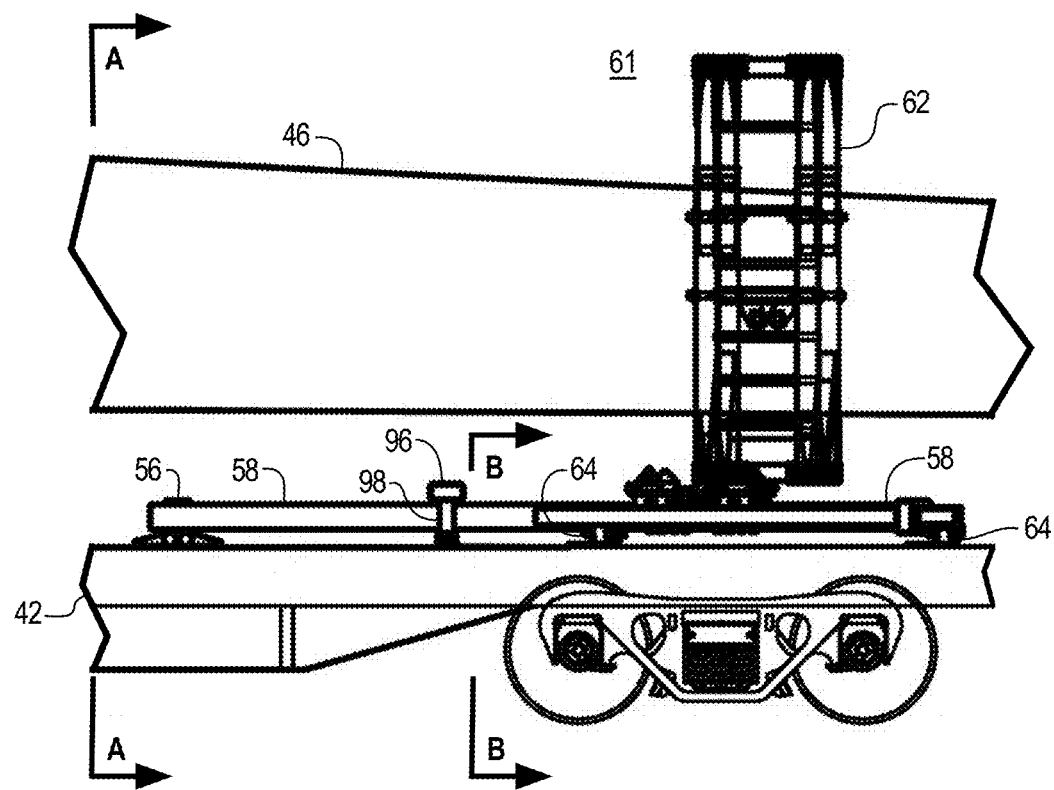
FIG. 17 is a side view drawing of a blade support assembly according to an illustrative embodiment of the present invention.

Reference is directed to FIG. 17, which is a side view drawing of a second blade support assembly 61 according to an illustrative embodiment of the present invention. FIG. 17 corresponds with FIG. 7. In FIG. 17, the second railcar 42 has a second pivot 56 fixed thereto. The second pivot 56 is fixed to a second radius arm 58, which is further connected to a second bolster 62. The second bolster 62 comprises internal brackets (not shown), which conform to the shape of the blade 46, to fixedly locate the blade 46 with respect to the second bolster 62. Second transverse bearings 64 are located between the second radius arm 58 and the second railcar 42 to carry the weight of the blade 46. In this illustrative embodiment, the second transverse bearings 64 are wheels. The second radius arm 58 is vertically retained by vertical retention member 96 that is connected to the second railcar 42 by vertical member 98.

Figure 18:
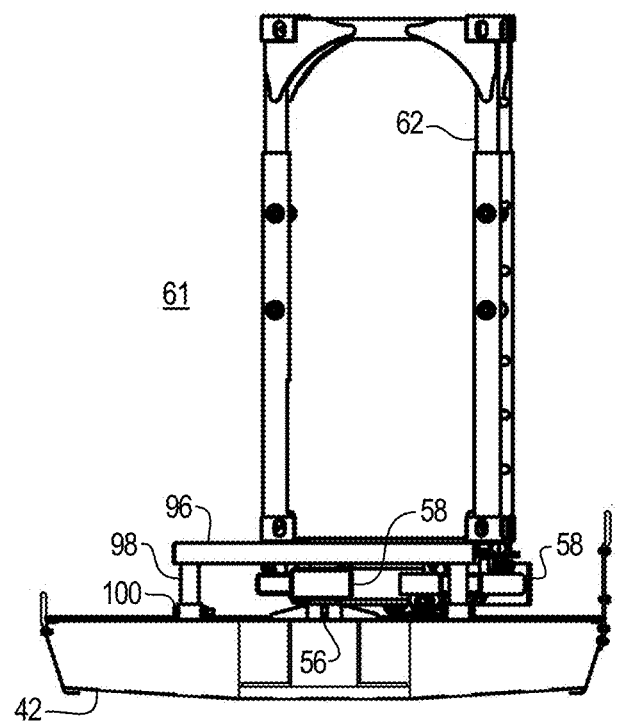
FIG. 18 is a section view drawing of a blade support assembly according to an illustrative embodiment of the present invention.

Reference is directed to FIG. 18, which is a section view drawing of a second blade support assembly 61 according to an illustrative embodiment of the present invention. FIG. 18 is a section view A-A taken from FIG. 17. FIG. 18 illustrates that the vertical retention member 96 is retained to the second railcar 42 using vertical member 98 that is pinned to a bracket 100, which is welded to the railcar 42. The second bolster 62 is illustrated without the internal brackets (not shown), which conform to the shape of the blade (not shown).

Figure 19:
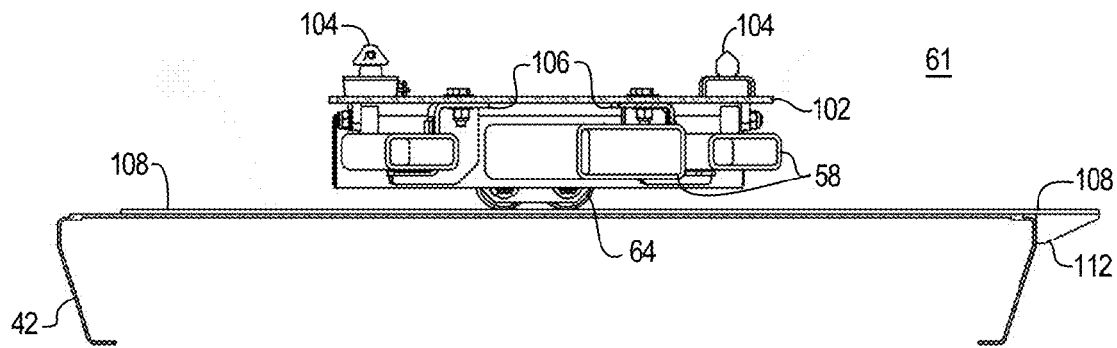
FIG. 19 is a section view drawing of a blade support assembly according to an illustrative embodiment of the present invention.

Reference is directed to FIG. 19, which is a section view drawing of a second blade support assembly 61 according to an illustrative embodiment of the present invention. FIG. 19 is a section view B-B taken from FIG. 17. In FIG. 19, the second railcar 42 is presented in section. A bearing plate 108 is welded to the second railcar 42 to provide a bearing surface for second lateral bearing members 64, which are steel wheels in this illustrative embodiment. An outrigger bracket 112 is provided to increase the length of travel of the second transverse bearing wheels 64 along their arcuate path on top of bearing plate 108. A slidable carriage 102 is slidably disposed on top of second radius arm 58. Plural guide brackets 106 align the slidable carriage 102 to slide parallel with the second radius arm 58. The slidable carriage 102 has plural twist lock fasteners 104 on its upper surface for engagedly retaining the second bolster (not shown) thereupon.

Figure 20:
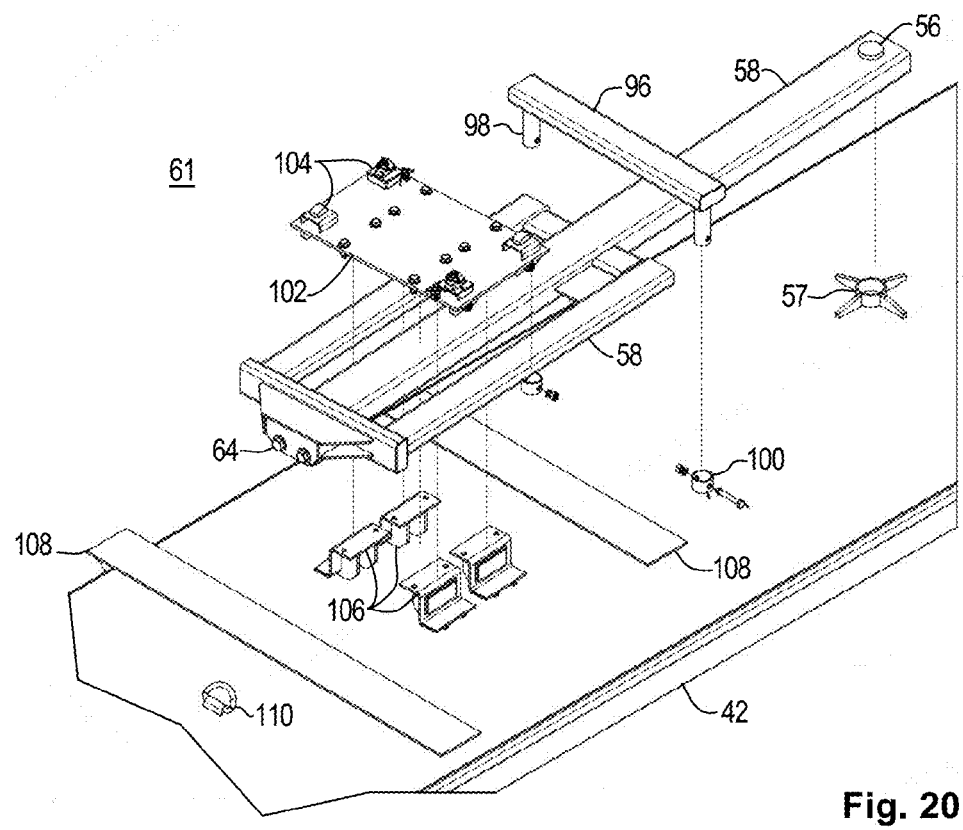
FIG. 20 is a exploded view drawing of a blade support assembly according to an illustrative embodiment of the present invention.

Reference is directed to FIG. 20, which is an exploded view drawing of a blade support assembly 61 according to an illustrative embodiment of the present invention. This view provides further details of the components and assembly of the second support assembly 61. The second pivot 56 engages a pivot fitting 57 that is welded to the second railcar 42. The radius arm 58 extends from the second pivot 56, and has the transverse bearing wheels 64 attached thereto. The wheels 64 ride on a pair of bearing plates 108 that are welded to the railcar 42. The vertical retention member 96, which is a structural tube, has vertical extensions 98 welded thereto. The vertical extensions 98 are pined to deck fitting 100, which are welded to the railcar 42. The slidable carriage 102 engages the radius arm 58 using four guide brackets 106, which have polymeric surface at the strategic bearing points to reduce friction. Plural twist lock fasteners 104 are fixed to the top surface f the slidable carriage 102 for engaging the second bolster (not shown).

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for transporting an elongated member having a root end and a support region located along its length, using a first railcar coupled to a second railcar, comprising:
  a first support assembly fixed to the root end by a root bolster that is fixed to a first radius arm extending below the elongated member to a first pivot coupled to the first railcar, to thereby enable the root end to laterally traverse the first railcar along an actuate path centered at said first pivot;
  a second support assembly, having a second bolster, for engaging the support region, coupled to a second radius arm extending below the elongated member to a second pivot coupled to the second railcar, to thereby enable the support region to laterally traverse the second railcar along an actuate path centered at said second pivot, and further having a slidable carriage disposed between said second radius arm and said second bolster, which slides parallel with said second radius arm, and wherein
  said first radius arm and said second radius arm are maintained in alignment as the first railcar and the second railcar traverse railroad curves, and thereby cause said root bolster and said second bolster to laterally traverse said first railcar and said second railcar, respectively, while said slidable carriage accommodates changes in distance between said root bolster and said second bolster.

2. The system of claim 1, and wherein the elongated member is a wind turbine blade, and the support region is predetermined by the wind turbine blade design specifications.

3. The system of claim 1, and wherein:
  said second radius arm extends in a direction that is toward the first railcar or that is away from the first railcar.

4. The system of claim 3, and wherein:
  said direction is selected based on the location of the support region with respect to lengths of the first and second railcars.

5. The system of claim 3, and wherein:
  said direction is selected to yield a minimum lateral overhang of the elongated member for a given radius of railroad curvature.

6. The system of claim 3, and wherein:
  said direction is selected to maintain the center of gravity of the elongated member within a center of gravity requirement of the first and second railcars.

7. The system of claim 1, and wherein:
  said first radius arm length and said second radius arm length are selected to yield a minimum lateral overhang of the elongated member for a given radius of railroad curvature.

8. The system of claim 1, and wherein:
  said first radius arm length and said second radius arm length are selected to maintain the center of gravity of the elongated member within a center of gravity requirement of the first and second railcars.

9. The system of claim 1, and wherein:
  said first radius arm and said second radius arm are maintained in generally parallel arrangement by the stiffness of the elongated member.

10. The system of 1, and wherein:
  said root bolster is removably engaged with said first radius arm, and
  said second bolster is removably engaged with said second radius arm.

11. The system of claim 1, and wherein:
  said second bolster conformally engages the elongated member along the support region.

12. The system of claim 1, further comprising:
  a first transverse bearing disposed between said first radius arm and the first railcar, and
  a second transverse bearing disposed between said second radius arm and the second railcar.

13. The system of claim 12, and wherein:
  said first traverse bearing comprises a wheel.

14. The system of claim 12, and wherein:
  said first transverse bearing comprises a pair of orthogonally aligned sub-carriages.

15. The system of claim 1, further comprising:
  a first vertical retention means fixed to the first railcar and configured to prevent said first radius arm from moving vertically, and a second vertical retention means fixed to the second railcar and configured to prevent said second radius arm from moving vertically.

16. The system of claim 1, and wherein:
said slidable carriage engages said second radius arm and said second bolster with at least a first wheel.

17. The system of claim 1, and wherein:
said slidable carriage engages said second radius arm and said second bolster with a low friction polymeric material.

18. A method for transporting an elongated member having a root end and a support region located along its length, using a first railcar coupled to a second railcar, comprising the steps of:
attaching a first radius arm to the first railcar using a first pivot, and fixing a root bolster between the root end and the first radius arm, thereby extending the first radius arm below the elongated member, and enabling the root end to laterally traverse the first railcar along an actuate path centered at the first pivot;
attaching a second radius arm to the second railcar using a second pivot, and engaging a second bolster between the support region and a slidable carriage, which slides along the second radius arm, the second radius arm extending below the elongated member, thereby enabling the support region to laterally traverse the second railcar along an actuate path centered at the second pivot, and
maintaining alignment of the first radius arm and the second radius arm as the first railcar and the second railcar traverse railroad curves, and thereby causing the root bolster and the second bolster to laterally traverse the first railcar and the second railcar, respectively, and, accommodating changes in distance between the root bolster and the second bolster by movement of the slidable carriage.

19. The method of claim 18, and further comprising the step of:
extending the second radius arm in a direction that is toward the first railcar or that is away from the first railcar.

20. The method of claim 19, further comprising the step of:
selecting said direction according to the location of the support region with respect to lengths of the first and second railcars.

21. The method of claim 19, further comprising the step of:
selecting said direction to yield a minimum lateral overhang of the elongated member for a given radius of railroad curvature.

22. The method of claim 19, further comprising the step of:
selecting said direction to maintain the center of gravity of the elongated member within a center of gravity requirement of the first and second railcars.

23. The method of claim 18, further comprising the step of:
selecting a length of the first radius arm and a length of the second radius arm to yield a minimum lateral overhang of the elongated member for a given radius of railroad curvature.

24. The method of claim 18, further comprising the step of:
selecting a length of the first radius arm and a length of the second radius arm to maintain the center of gravity of the elongated member within a center of gravity requirement of the first and second railcars.

25. The method of claim 18, further comprising the step of:
maintaining the first radius arm and the second radius arm in generally parallel alignment using the stiffness of the elongated member.

26. The method of claim 18, further comprising the steps of:
disposing a first transverse bearing between the first radius arm and the first railcar, and
disposing a second transverse bearing between the second radius arm and the second railcar.

27. The method of claim 18, further comprising the steps of:
fixing a first vertical retention member to the first railcar, thereby preventing the first radius arm from moving vertically, and
fixing a second vertical retention member to the second railcar, thereby preventing the second radius arm from moving vertically.

* * * * *